US010582262B2

(12) United States Patent
Beattie, Jr. et al.

(10) Patent No.: US 10,582,262 B2
(45) Date of Patent: Mar. 3, 2020

(54) SATELLITE VIDEO CONTENT DELIVERY SYSTEM

(71) Applicant: AT&T INTELLECTUAL PROPERTY I, LP, Atlanta, GA (US)

(72) Inventors: James G. Beattie, Jr., Bergenfield, NJ (US); Arvind Ramdas Mallya, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 17 days.

(21) Appl. No.: 15/199,197

(22) Filed: Jun. 30, 2016

(65) Prior Publication Data

US 2018/0007435 A1    Jan. 4, 2018

(51) Int. Cl.
*H04N 21/45*    (2011.01)
*H04N 21/61*    (2011.01)

(52) U.S. Cl.
CPC ..... *H04N 21/4524* (2013.01); *H04N 21/6193* (2013.01)

(58) Field of Classification Search
CPC ........... H04N 21/4524; H04N 21/6193; H04N 21/64723
See application file for complete search history.

(56) References Cited

U.S. PATENT DOCUMENTS

| 4,896,369 A | 1/1990 | Adams et al. |
| 4,941,199 A | 7/1990 | Saam et al. |
| 5,060,292 A | 10/1991 | Ayukawa et al. |
| 5,828,335 A | 10/1998 | Al-Dhahir et al. |

(Continued)

FOREIGN PATENT DOCUMENTS

| DE | 102011018975 A1 | 12/2011 |
| EP | 1137198 A2 | 9/2001 |
| EP | 2890143 A1 | 7/2015 |
| KR | 20080303 31 | 4/2008 |
| WO | 2015111050 A1 | 7/2015 |

OTHER PUBLICATIONS

Rittiner, Dawn et al., Social media and crisis mapping: recent developments and application ideas for crisis response. (2013).

(Continued)

*Primary Examiner* — Hai V Tran
*Assistant Examiner* — Susan X Li
(74) *Attorney, Agent, or Firm* — Guntin & Gust, PLC; Matthew Tropper

(57) ABSTRACT

Aspects of the subject disclosure may include, for example, a method including determining a degradation of satellite reception in a first geographic area, receiving a weather report for the first geographic area to determine a weather condition, determining a movement of the weather condition to a second geographic area, determining an impairment vector based on the movement to the second geographic area to determine if equipment of customers of a satellite content provider will have an impaired reception of media content, initiating a streaming of media content to the equipment of the customers in the second geographic area according to the impairment vector, and disabling the streaming of the media content to the equipment of the customers in the second geographic area responsive to determining that the second geographic area is no longer impaired by the weather condition. Other embodiments are disclosed.

20 Claims, 6 Drawing Sheets

(56) References Cited

U.S. PATENT DOCUMENTS

| | | |
|---|---|---|
| 6,169,881 B1 | 1/2001 | Astrom et al. |
| 6,195,680 B1 * | 2/2001 | Goldszmidt ............ H04L 12/56 709/203 |
| 6,925,113 B2 | 8/2005 | Kim et al. |
| 7,047,029 B1 * | 5/2006 | Godwin ............. H04B 7/18513 455/505 |
| 7,181,345 B2 | 2/2007 | Rosenfeld et al. |
| 7,532,860 B2 | 5/2009 | Loner et al. |
| 7,801,101 B2 | 9/2010 | Ryu et al. |
| 8,099,753 B2 | 1/2012 | White et al. |
| 8,131,212 B2 | 3/2012 | Laufer |
| 8,364,107 B2 | 1/2013 | Jackson et al. |
| 8,385,223 B2 | 2/2013 | Miller et al. |
| 8,473,196 B2 | 6/2013 | Basnayake et al. |
| 8,626,097 B2 | 1/2014 | Tomko et al. |
| 8,693,946 B2 | 4/2014 | Laufer et al. |
| 8,787,237 B2 | 7/2014 | Väre et al. |
| 8,875,190 B2 | 10/2014 | Barroso |
| 8,918,097 B2 | 12/2014 | Delellis et al. |
| 8,923,753 B2 | 12/2014 | Rozmaryn |
| 9,025,679 B2 | 5/2015 | Ryu et al. |
| 9,143,224 B2 | 9/2015 | Kim et al. |
| 2009/0217364 A1 * | 8/2009 | Salmela ................ H04W 12/06 726/6 |
| 2013/0132122 A1 * | 5/2013 | Walsh .................... G06Q 40/08 705/4 |
| 2014/0094113 A1 * | 4/2014 | Kim .................. H04B 7/18523 455/12.1 |
| 2014/0208349 A1 | 7/2014 | Nair et al. |
| 2015/0067017 A1 * | 3/2015 | Shah ................... H04L 65/4084 709/202 |
| 2016/0088351 A1 | 3/2016 | Petruzzelli et al. |
| 2016/0191913 A1 * | 6/2016 | March ................ H04N 17/004 348/189 |
| 2017/0013587 A1 * | 1/2017 | Laufer ................. H04B 17/373 |

OTHER PUBLICATIONS

Schulman, Aaron et al., Pingin' in the rain. Proceedings of the 2011 ACM SIGCOMM conference on Internet measurement conference. ACM, 2011.

* cited by examiner

300

SATELLITE VIDEO CONTENT DELIVERY SYSTEM

FIELD OF THE DISCLOSURE

The subject disclosure relates to a system that manages satellite video content delivery.

BACKGROUND

Delivery of satellite video content can be hampered by bad weather or other events. For example, the water in rain or snow can absorb and diffuse a satellite signal causing the satellite signal to be unusable by satellite receiver.

BRIEF DESCRIPTION OF THE DRAWINGS

Reference will now be made to the accompanying drawings, which are not necessarily drawn to scale, and wherein.

DETAILED DESCRIPTION

Figure 1:
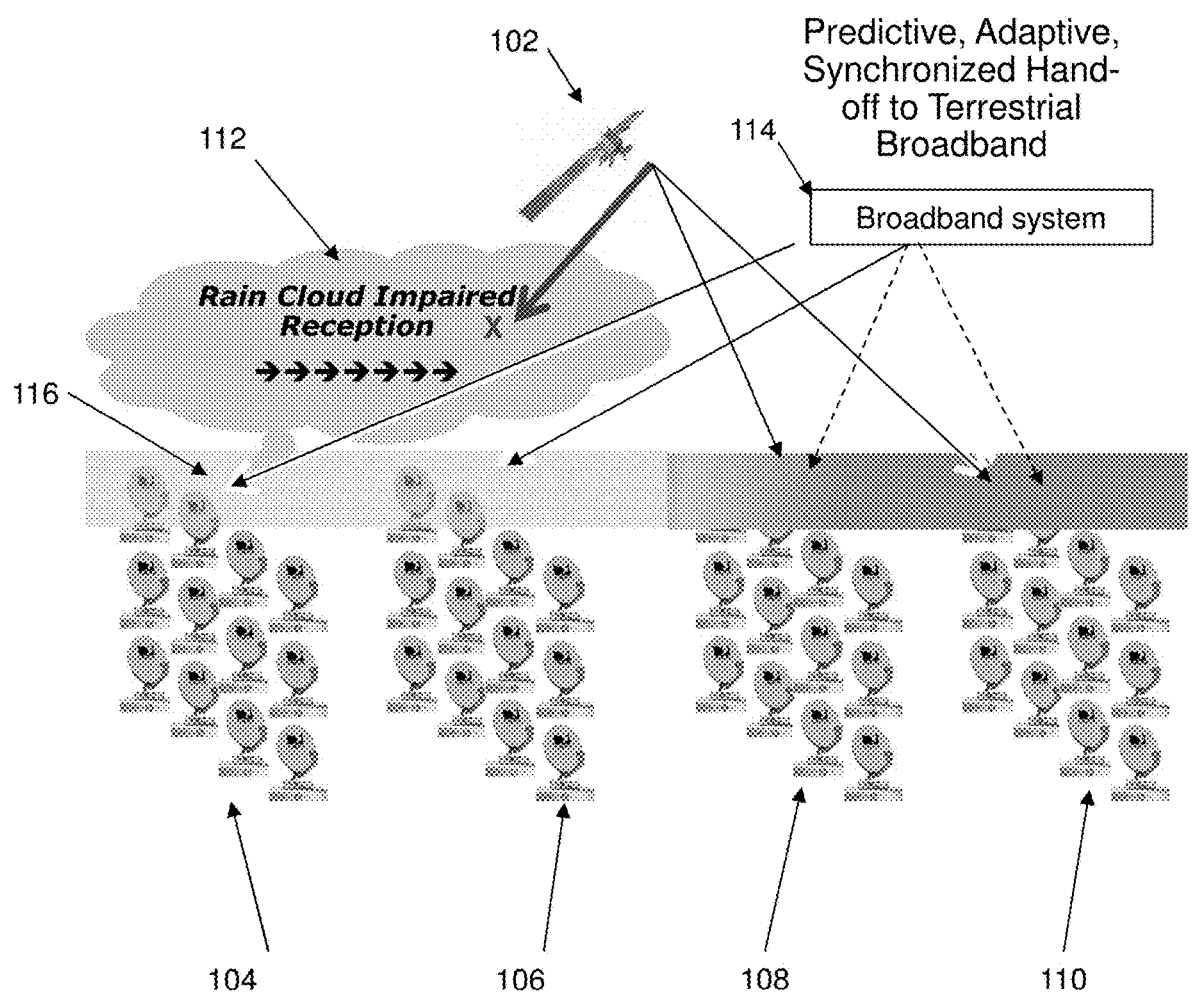
FIG. 1 depicts an illustrative embodiment of a satellite video content delivery system 100.

The subject disclosure describes, among other things, illustrative embodiments for predicting when and where weather-based impairments will affect satellite video content delivery and mitigating the impairment. Other embodiments are described in the subject disclosure.

One or more aspects of the subject disclosure include a method including determining, by a processing system including a processor, a degradation of satellite reception in a first geographic area, receiving, by the processing system, a weather report for the first geographic area to determine a weather condition, determining, by the processing system, a movement of the weather condition to a second geographic area, determining, by the processing system, an impairment vector based on the movement to the second geographic area to determine if equipment of customers of a satellite content provider will have an impaired reception of media content from the satellite content provider, initiating, by the processing system, a streaming of media content to the equipment of the customers in the second geographic area according to the impairment vector, determining, by the processing system, that the second geographic area is no longer impaired by the weather condition, and disabling, by the processing system, the streaming of the media content to the equipment of the customers in the second geographic area responsive to the determining that the second geographic area is no longer impaired by the weather condition.

One or more aspects of the subject disclosure include a device that includes a processing system including a processor and a memory that stores executable instructions that, when executed by the processing system, facilitate performance of operations, including determining a degradation of a satellite reception of a satellite content provider in an geographic area adjacent to the device, determining an impairment vector based on a movement of the degradation from the geographic area adjacent to the device towards a present geographic area to determine if an impaired reception of media content from the satellite content provider will occur, requesting an initiation of a streaming of media content responsive to the determining that the impaired reception will occur in the present geographic area, determining that the present geographic area is no longer degraded, and requesting a disabling of the streaming of the media content to the customer equipment in the present geographic area responsive to the determining that the satellite reception in the present geographic area is no longer degraded.

One or more aspects of the subject disclosure include a machine-readable storage medium, including executable instructions that, when executed by a processing system including a processor, facilitate performance of operations, including receiving a report from a first geographic area that a reception of a satellite signal is degraded, determining a movement of a condition causing the degrading of the satellite signal to a second geographic area, determining an impairment vector based on the movement to the second geographic area to determine if customer equipment in the second geographic area of a satellite content provider will have a degraded reception of media content from the satellite content provider, initiating a streaming of media content to the customer equipment in the second geographic area according to the impairment vector, and disabling the streaming of the media content to the customer equipment in the second geographic area responsive to determining that the second geographic area is no longer impaired by the condition.

FIG. 1 depicts an illustrative embodiment of a satellite video content system 100. In exemplary embodiments, the satellite video content system 100 can ensure delivery continuity of satellite video content to subscribers when a weather event causes a deterioration of a satellite signal. Satellite video content system 100 exemplarily includes one or more satellites 102 that provide signals to subscriber devices 104, 106, 108, and 110. In some embodiments, subscriber devices 104, 106, 108, and 110, or customer equipment, are located in different geographic areas.

In some instances, a weather event 112 or a weather condition may occur. The weather event 112 can move across the different geographic locations of subscriber devices 104, 106, 108, and 110. As illustrated in FIG. 1, as the weather event 112 moves across geographic locations, reception of the satellite signal can be impaired for those geographic locations. Thus, the subscriber devices 104 and 106 exemplify customer equipment that receive satellite video content from a satellite content provider in geographic locations that are currently experiencing impaired or degraded reception of their satellite signals from the satellite 102. In addition, in this embodiment, it can be observed that subscriber devices 108 and 110 are likely to be impaired in succession by the weather event 112 as the weather event 112 likely will move from location to location.

Exemplarily, as each of the subscriber devices 104, 106, 108, and 110 become impaired by having the satellite signal from the satellite 102 degraded, a broadband system 114 can be employed to provide media content to the subscriber devices that would have been provided by the satellite 102.

Thus, as illustrated in FIG. 1, subscriber devices 104 and 106 are receiving media content from the broadband system 114. In addition, subscriber devices 108 are exemplarily preparing to receive media content from the broadband system 114. Exemplarily, subscriber devices are preparing to utilize the broadband service based on a prediction that the weather event 112 was likely to affect their service next. In some embodiments, subscriber devices 110 would not receive or prepare to receive broadband signals until their satellite signals were lost or predicted to be lost. In other embodiments, an alternate media content provider network, such as an interactive television network, can be accessed to provide the media content.

Exemplarily, the movement of a weather event or condition across geographic areas can be predicted based on the location, direction, and speed at which weather patterns move the weather event. For example, a rain storm or blizzard will slowly or rapidly move across regions, affecting different areas at different times before the rain storm dissipates, changes course, or blows out to sea. Additionally, by accessing weather reports, including satellite imagery and radar maps, for example, the track or movement of the weather event can be monitored or predicted. Based on these capabilities, an impairment vector that describes a likely track of the weather event can be generated. Exemplarily, the impairment vector describes a likelihood of a satellite signal to be degraded by a weather event based on the location of subscriber devices in the path or near the path of the weather event. The impairment vector can also predict likely times the degrading of the satellite signal may occur. Thus, as illustrated in FIG. 1, a weather vector 116 shows the progress of the weather event 112 across different geographic regions as subscriber devices 104 and 106 are suffering an impairment based on a degradation of the satellite signal. In addition, it is predicted that subscriber device 108 is likely to suffer from a degraded signal as illustrated by the shift in shading of the illustrated impairment vector 116.

Figure 2:
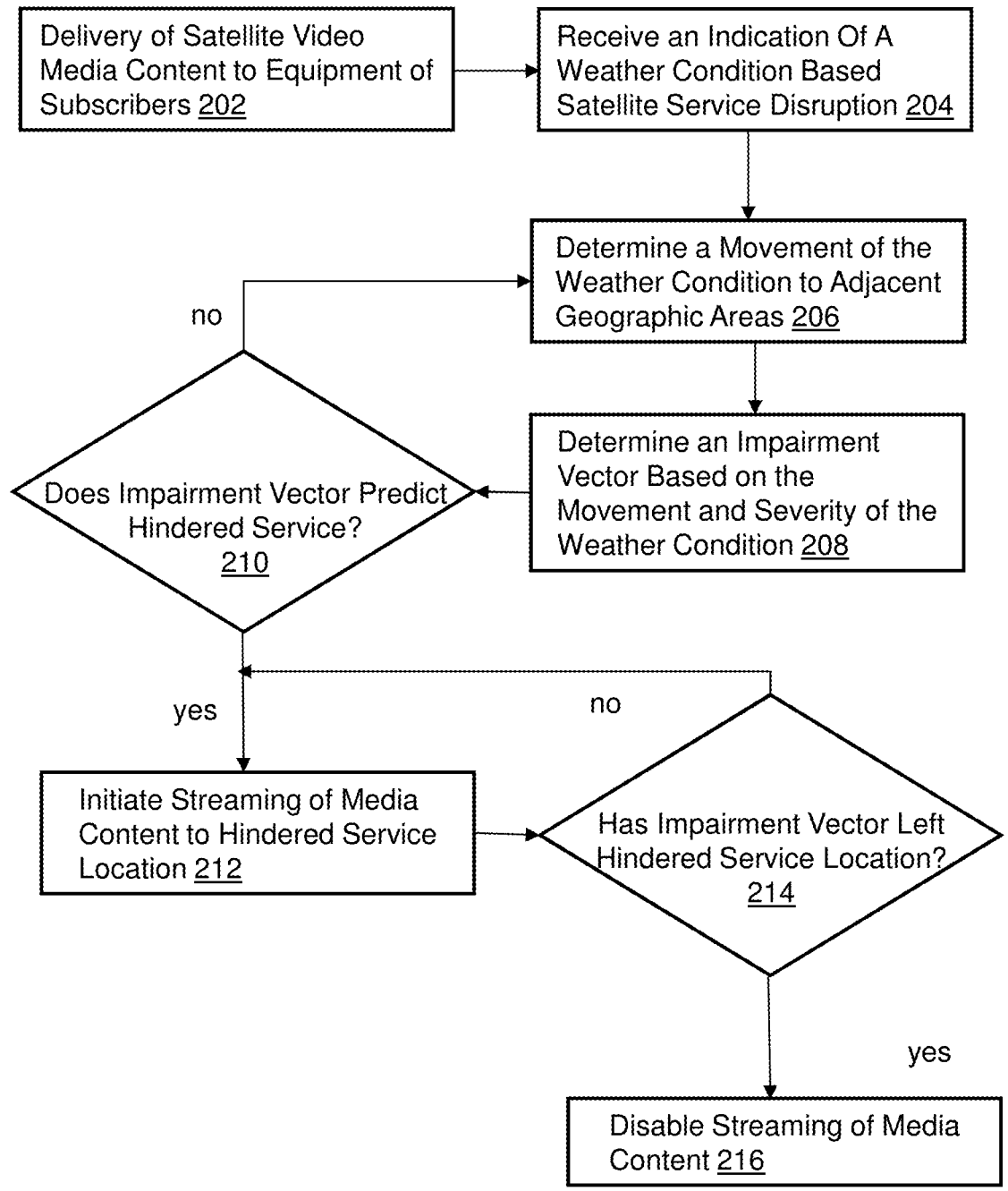
FIG. 2 depicts an illustrative embodiment of a method 200 used in portions of the system described in FIG. 100.

FIG. 2 depicts an illustrative embodiment of method 200 used by satellite video content system 100. Method 200 can exemplarily begin in Step 202 in which a regular, unimpaired satellite video delivery service is ongoing across several geographic regions. That is, for example, the satellite 102 of FIG. 1 is providing a satellite signal to subscriber devices 104, 106, 108, and 110 which symbolize user equipment that receives satellite signals at various geographic locations. Method 200 is exemplarily performed in and across these geographic locations simultaneously. These geographic locations can be predefined, based on a capability of a particular satellite to provide media content, or determined as weather conditions change.

In step 204, a degradation of the satellite signal in an adjacent area is detected. That is, depending on the particular geographic location method 200 is being performed, a relevant, neighboring, or nearby geographic area can report a degradation of service. In additional embodiments, weather reports can be monitored or social media accounts that report the relevant weather event, or weather conditions, for that location can be accessed. In other embodiments, the equipment of the user can also report to the system 100 that it is unable to receive a satellite signal. The equipment can exemplarily determine that the loss of signal is consistent with a weather condition that degrades satellite signals. Additionally, the satellite provider can monitor these reports from the equipment of the users to aggregate an understanding of the size, severity, and movement of a weather event to inform the creation of an impairment vector.

Exemplarily, in step 206, a movement of the weather event from one geographic location to other geographic locations is determined. Exemplarily, reports from nearby or relevant geographic locations can be used to predict an impairment for the location in step 206. In addition, in some embodiments, weather reports from third-party sources can be used as part of the predicting an impairment. Furthermore, social media accounts can be accessed if the weather event is mentioned or if outages are mentioned. In additional embodiments, reports from individual subscriber devices can be aggregated by the satellite video content delivery system. In addition, the satellite video content delivery system can receive reports of when the satellite signal is no longer degraded.

Based on the movement of the weather event, an impairment vector for the weather event can be determined in step 208. The impairment vector can be a prediction of which subscriber devices will be affected by the weather event. The impairment vector can attempt to model the weather condition to determine which geographic locations are likely to suffer from a degraded satellite signal and at what time the weather condition will affect those devices. Thus, as illustrated in FIG. 1, the weather event 112 is affecting subscriber devices 104 and 106 and an impairment vector can predict that subscriber device 108 is likely to suffer from a degraded signal as illustrated by the shift in shading of the illustrated impairment vector 116. As further illustrated in FIG. 1, it appears that subscriber device 110 is not yet likely to be impacted by the weather event 112 as impairment vector 116 does not touch that device. However, as new reports of satellite signal degrading are received, the impairment vector 116 could be modified to include subscriber device 110.

In step 210, if an impairment or a degradation of the satellite signal is predicted for the present geographic location, method 200 proceeds to step 212 in which content is streamed over a broadband network to the subscriber devices in that geographic location. Exemplarily, streaming can start proactively before the satellite signal is degraded enough to be noticeable at the equipment of the subscriber, such as before visible pixilation occurs. On the other hand, if the prediction of the impairment vector does not indicate a hindered service, method 200 can return to step 206 to monitoring the movement of the weather event and to step 208 in which the impairment vector is determined.

Exemplarily, the streaming of step 212 can also include preparations for the streaming. These preparation can include ensuring enough bandwidth is available for streaming media content to the subscriber devices. The preparations can further include changing billing rates for the affected areas so as to provide, for example, a discount on bandwidth overages. Preparations can also include determining a quality of the media content so as to reduce broadband resources. That is, some media content may be downgraded to limit the bandwidth cost for providing that media content.

In additional embodiments, a decision between different broadband providers can be made. The decision can be based on a quality of video media content to be streamed. High quality video media content can require a selection of a higher speed service while lower quality video media content can be accessed through a slower speed broadband service, such as a cellular broadband access point. In other embodiments, an additional media provider, such as a terrestrial interactive television network, may be employed.

Next, in step 214, it is determined if the impairment vector has departed the geographic location. If the weather event no longer prevents the satellite signal from being received, the streaming of the media content is disabled in step 216. In some embodiments, the subscriber devices can continually or intermittently monitor the satellite signal to determine if the satellite signal is degraded. In additional embodiments, a period of time may be required to elapse before switching back to use of the satellite signals to ensure the weather event has passed. Otherwise, the streaming of step 212 will exemplarily continue. In some embodiments, the streaming may time out if a certain time limit or data limit is met to end the streaming and to rely on the satellite signal.

Figure 3:
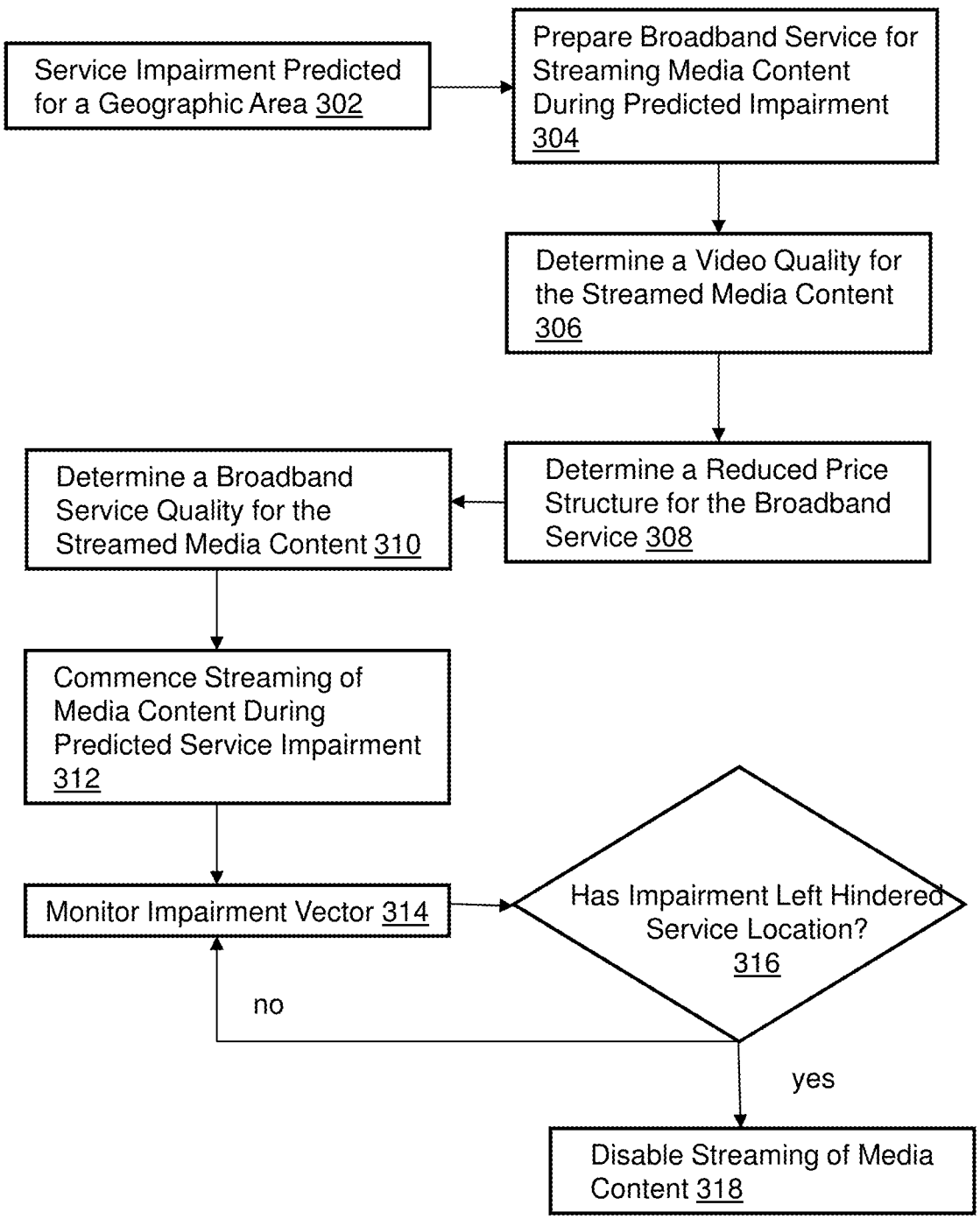
FIG. 3 depicts an illustrative embodiment of a method 300 used in portions of the system described in FIG. 100.

FIG. 3 depicts an illustrative embodiment of method 300 used by satellite video content system 100. Method 300 exemplarily beings at step 302 in which an impairment vector for a geographic location is predicted to occur. Responsive to detecting the impairment vector, in step 304, a broadband service is prepared to stream media content in place of the satellite media content that will be disrupted by the weather event.

Exemplarily, the preparation for the weather event will include, in step 306, a determination of video quality for the media content that will be provided during the weather event's impairment of the satellite signal. For example, a lowered video quality may be necessary to provide media content via the broadband network. Thus, for example, in some embodiments, 4K video content may be downgraded to a lesser video quality. In other embodiments, some media content features may be unavailable during the weather event, such eliminating 3-D presentations of the media content.

In some embodiments, method 300 can proceed to step 308 in which billing for the broadband service can be adjusted because of the weather event. Thus, in some instances, customers would not be charged extra for use of the broadband service's bandwidth during the weather event. Next, in step 310, the quality of the broadband service itself could be altered for the duration of the weather event. Thus, for example, some customers could receive an upgrade in speed while other customers could have their broadband service reduced or throttled so as to provide more bandwidth for more customers.

Once the preparations have been made in anticipation of the predicted impairment vector, in step 312, the streaming of media content commences. The commencement of the streaming of the media content can occur at a time before an impairment of the satellite signal becomes noticeable. Thus, the streaming may not begin until a detected satellite signal degrades to a certain point. In other embodiments, the decision may be based on a proximity to the weather event itself solely based on the prediction of the impairment vector. In yet other embodiments, the decision may be based on an overall readiness of the broadband network to begin streaming media content.

During the streaming of media content, the impairment vector can be monitored in step 314. In step 316, if the impairment vector has departed or shows that the weather event has dissipated, then in step 318, the streaming can be disabled. If the weather event or impairment vector is shown to still be present in the geographic location, then method 300 can return to step 314 and monitor the progress of the impairment vector.

Figure 4:
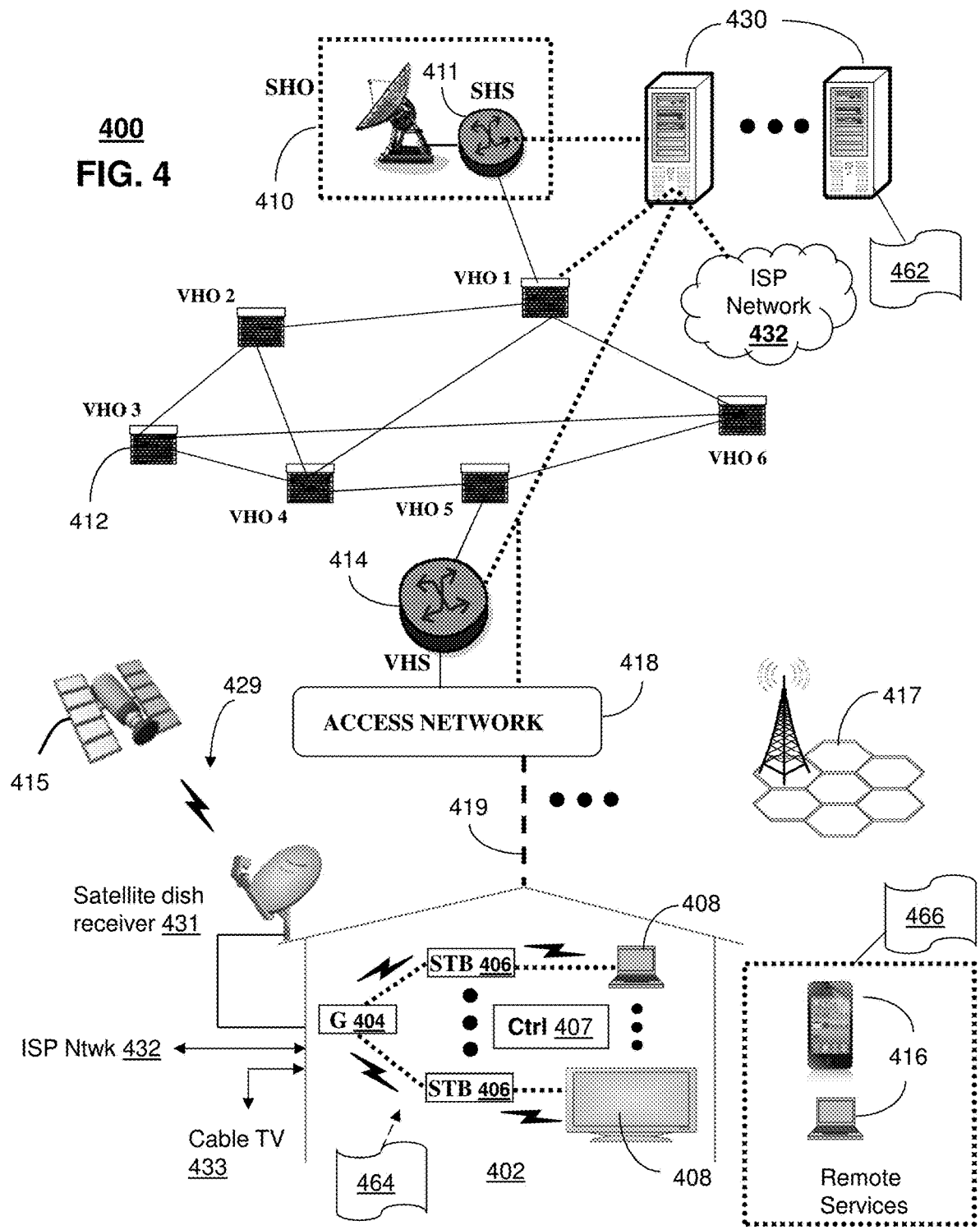
FIG. 4 depicts an illustrative embodiment of a communication system that provide media services.

While for purposes of simplicity of explanation, the respective processes are shown and described as a series of blocks in FIGS. 2-4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. For instance, one or more devices illustrated in the communication system 400 of FIG. 4 can determine a degradation of satellite reception in a first geographic area, receiving a weather report for the first geographic area to determine a weather condition, determine a movement of the weather condition to a second geographic area, determine an impairment vector based on the movement to the second geographic area to determine if equipment of customers of a satellite content provider will have an impaired reception of media content from the satellite content provider, initiate a streaming of media content to the equipment of the customers in the second geographic area according to the impairment vector, determine that the second geographic area is no longer impaired by the weather condition, and disable the streaming of the media content to the equipment of the customers in the second geographic area responsive to the determining that the second geographic area is no longer impaired by the weather condition.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. Exemplarily, set-top box 406 can receive media content via the ISP network 432 or via a wireless access base station 417.

Communication system 400 can also provide for all or a portion of the computing devices 430 to function as a broadband media content server (herein referred to as broadband media content server 430). The broadband media content server 430 can use computing and communication technology to perform function 462, which can include among other things, the streaming of media content to a hindered service location as described, for example, in FIG. 2. For instance, function 462 of server 430 can be similar to the functions described of the broadband system 114 of FIG. 1 in accordance with the methods of FIGS. 2 and 3. The media processors 406 and wireless communication devices 416 can be provisioned with software functions 464 and 466, respectively, to utilize the services of broadband media content server 430. For instance, functions 464 and 466 of media processors 406 and wireless communication devices 416 can be similar to the functions described for the subscriber devices 104, 106, 108, and 110 of FIG. 1 in accordance with the methods of FIGS. 2 and 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
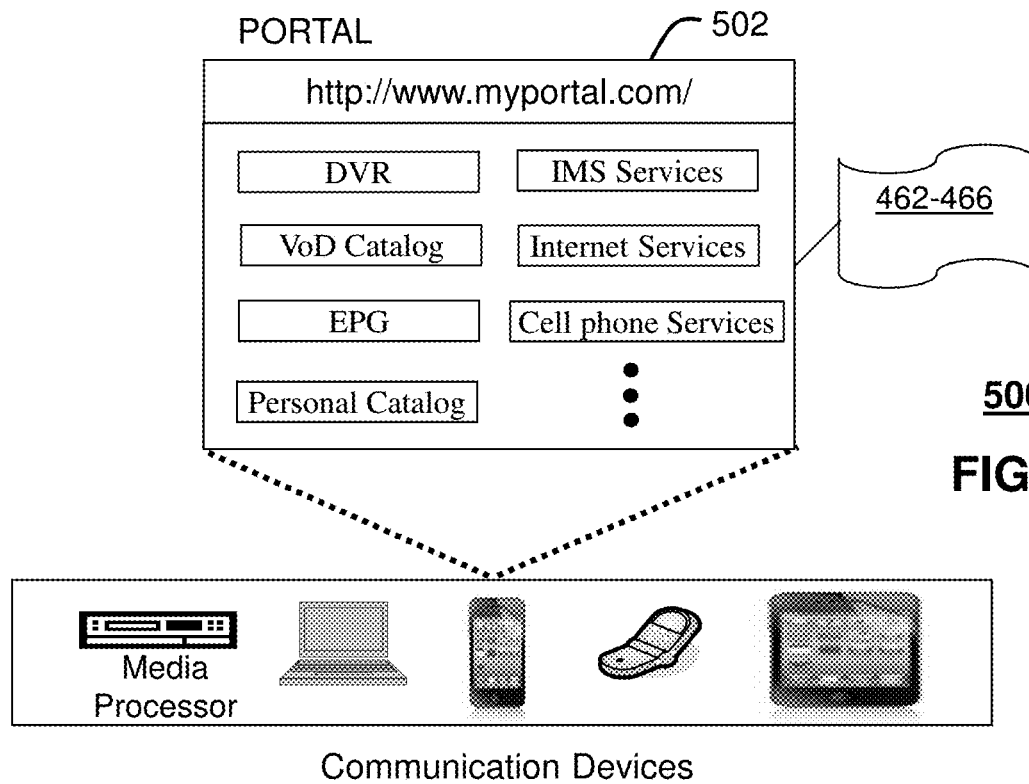
FIG. 5 depicts an illustrative embodiment of a web portal for interacting with the communication systems of system 100 and communications system 400.

FIG. 5 depicts an illustrative embodiment of a web portal 502 of a communication system 500. Communication system 500 can be overlaid or operably coupled with system 100 of FIG. 1, communication system 400, as another representative embodiment of system 100 of FIG. 1 and/or communication system 400. The web portal 502 can be used for managing services of system 100 of FIG. 1 and communication system 400. A web page of the web portal 502 can be accessed by a Uniform Resource Locator (URL) with an Internet browser using an Internet-capable communication device such as those described in FIG. 1 and FIGS. 4-5. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462, 464, and 466 to adapt these applications as may be desired by subscribers and/or service providers of system 100 of FIG. 1 and communication system 400. For instance, subscriber devices 104, 106, 108, and 110, for example, can log into their on-line accounts and provision the broadband servers 114 or server 430 with preferred instructions on how to provide media content during an outage, and so on. Service providers can log onto an administrator account to provision, monitor and/or maintain the system 100 of FIG. 1 or server 430.

Figure 6:
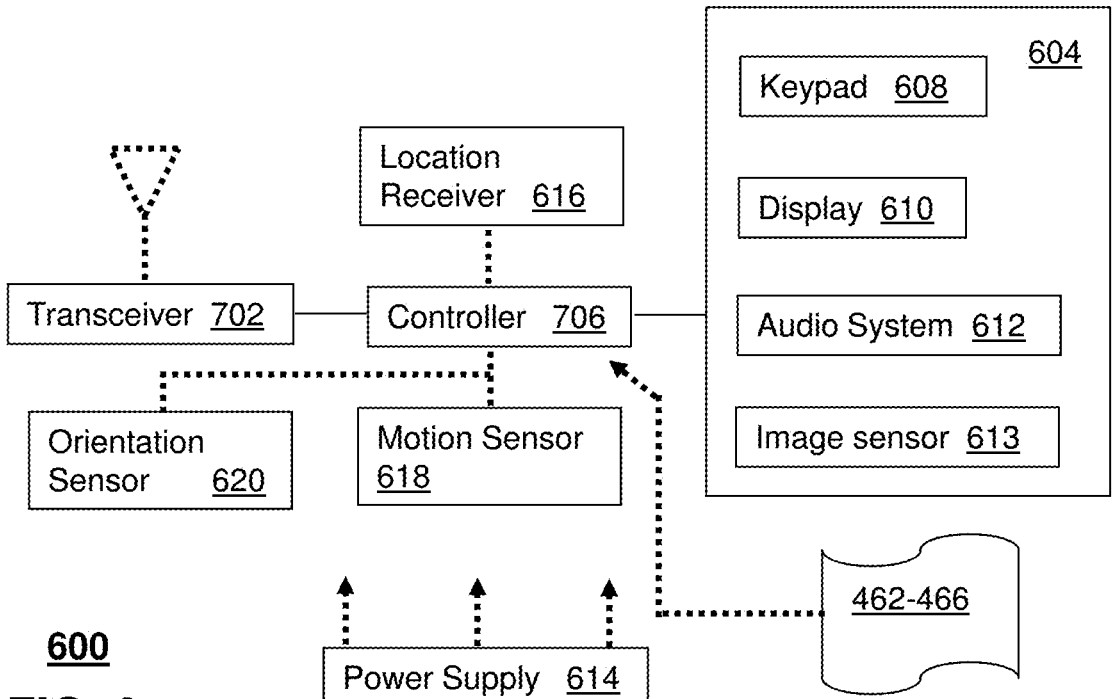
FIG. 6 depicts an illustrative embodiment of a communication device.

FIG. 6 depicts an illustrative embodiment of a communication device 600. Communication device 600 can serve in whole or in part as an illustrative embodiment of the devices depicted in system 100 of FIG. 1 and communication system 400 and can be configured to perform portions of methods 200 and 300 of FIGS. 2 and 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600.

In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of subscriber devices 104, 106, 108, and 110, the media processor 406, the media devices 408, or the portable communication devices 416 of FIG. 4. It will be appreciated that the communication device 600 can also represent other devices that can operate in system 100 of FIG. 1 and communication system 400, such as a gaming console and a media player. In addition, the controller 606 can be adapted in various embodiments to perform the functions 462, 464, and 466, respectively.

Upon reviewing the aforementioned embodiments, it would be evident to an artisan with ordinary skill in the art that said embodiments can be modified, reduced, or enhanced without departing from the scope of the claims described below. For example, alternative sources of the media content can be accessed. For example, if network conditions for the broadband connection make are determined to be unsuitable for delivering media content to the equipment of the user, then an alternative source can be accessed. In some embodiments, this alternative source can be a different broadcast content provider or a broadband media content delivered via a cellular service. The determination to use the alternative source can be based on network traffic and stability. In some embodiments, the determining may be based on a type of media content being streamed as lower quality video content may not require a high bandwidth source. Furthermore, in other embodiments, the subscription status of the user with the satellite service provider may determine the availability of the alternative source of streaming of the media content. For example, some subscribers may only be allowed to receive standard definition media content while higher end subscribers can still receive high-definition media content. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
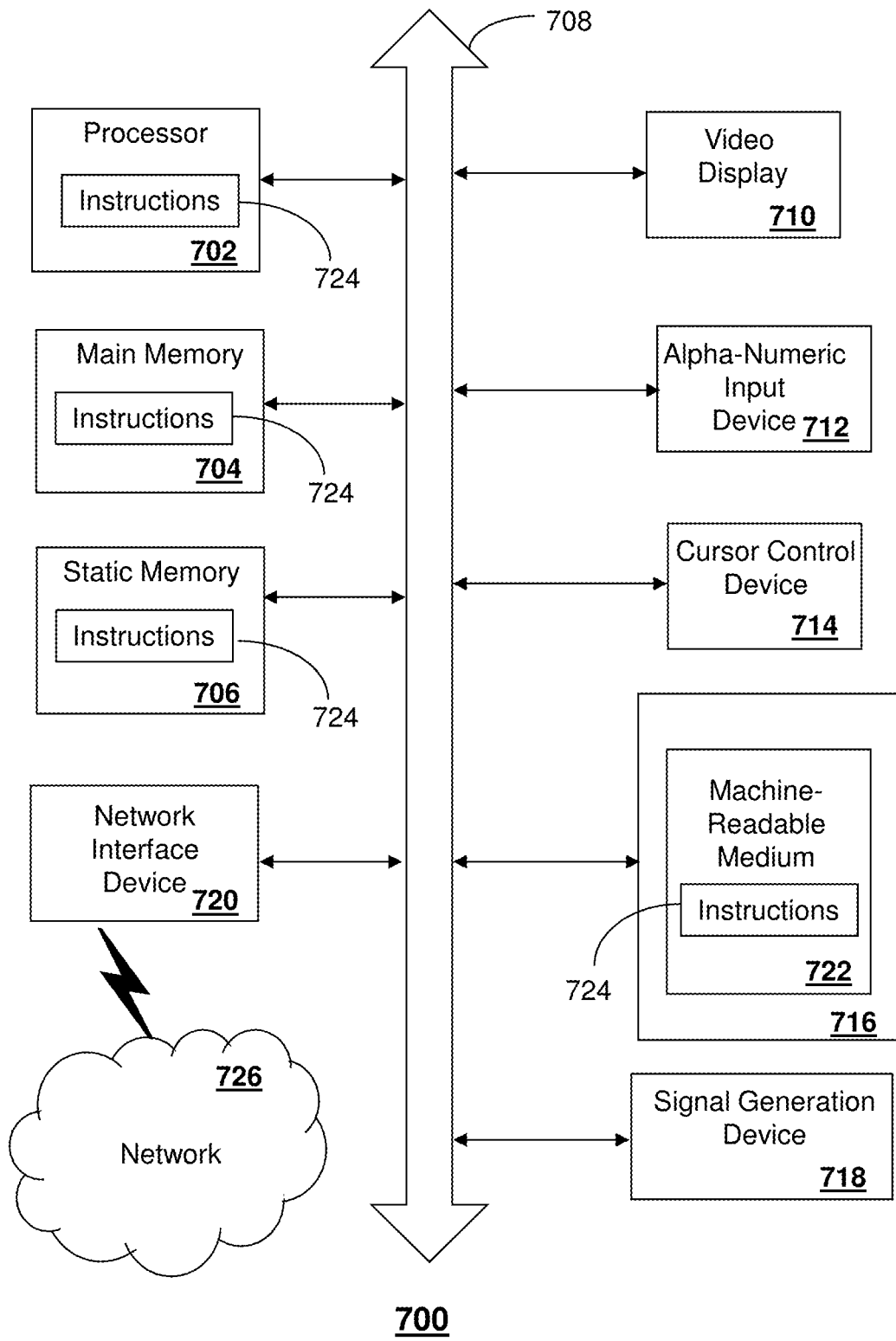
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the broadband media content server 430, the media processor 406, the subscriber devices 104, 106, 108, and 110, and the broadband system 114 of FIGS. 1 and 4-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   determining, by a processing system including a processor, a degradation of satellite reception in a first geographic area;
   receiving, by the processing system, a weather report for the first geographic area to determine a weather condition;
   determining, by the processing system, a movement of the weather condition to a second geographic area based on the weather report;
   determining, by the processing system, an impairment vector based on the movement of the weather condition to the second geographic area to determine whether equipment of customers, in the second geographic area, of a satellite content provider will have an impaired reception of media content from the satellite content provider;
   responsive to a determination, based on the impairment vector, that the equipment of the customers in the second geographic area will have the impaired reception of the media content, determining, by the processing system, an alternative source of the media content from a plurality of alternative sources according to network availability of the alternative source, resolution of the media content, and a subscription status associated with the equipment of the customers;
   scheduling an increase in an availability of bandwidth for a broadband service connected to the equipment of the customers in the second geographic area based on the impairment vector, wherein the increase is based on a reduction of broadband service for second equipment of second customers;

initiating, by the processing system, a streaming of the media content to the equipment of the customers in the second geographic area via the alternative source; and applying by the processing system, according to whether a data limit associated with the streaming has been met, a first technique if the data limit has been met or a second technique if the data limit has not been met;

wherein the first technique comprises:
  disabling, by the processing system, the streaming of the media content via the alternative source to the equipment of the customers in the second geographic area; and wherein the second technique comprises:
  determining, by the processing system, that the second geographic area is no longer impaired by the weather condition; and
  disabling, by the processing system, the streaming of the media content via the alternative source to the equipment of the customers in the second geographic area responsive to the determining that the second geographic area is no longer impaired by the weather condition.

2. The method of claim 1, wherein the determining that the second geographic area is no longer impaired comprises detecting a restoring of a streaming of satellite content from the satellite content provider.

3. The method of claim 1, wherein the initiating of the streaming of the media content comprises downloading the media content from a broadband system, wherein the alternative source of the media content is further determined according to performance criteria of the plurality of alternative sources, and wherein the performance criteria comprises network bandwidth associated with the plurality of alternative sources.

4. The method of claim 1, wherein the initiating of the streaming of the media content comprises reducing a billing rate for the streaming of the media content while the second geographic area is impaired by the weather condition.

5. The method of claim 1, further comprising determining a quality of the bandwidth for the broadband service connected to the equipment of the customers in the second geographic area based on the impairment vector.

6. The method of claim 1, further comprising determining a media content quality for the media content delivered to the equipment of the customers in the second geographic area based on the impairment vector.

7. The method of claim 1, wherein the initiating of the streaming of the media content comprises streaming the media content from a broadband system and wherein the alternative source of the media content is further determined according to performance criteria of the plurality of alternative sources, and wherein the performance criteria comprises network stability of the plurality of alternative sources.

8. The method of claim 1, wherein the initiating of the streaming of the media content to the equipment of the customers in the second geographic area via the alternative source occurs before visible pixilation of the media content at the equipment of the customers in the second geographic area occurs.

9. A device, comprising:
a processing system including a processor; and
a memory that stores executable instructions that, when executed by the processing system, facilitate performance of operations, the operations comprising:

determining that a degradation of a satellite signal of a satellite content provider in a geographic area adjacent to the device is occurring;

determining an impairment vector based on a movement of the degradation from the geographic area adjacent to the device towards a present geographic area of the device to determine whether the degradation of the satellite signal of the satellite content provider will occur in the present geographic area of the device;

responsive to a determination, based on the impairment vector, that the degradation of the satellite signal of the satellite content provider will occur in the present geographic area of the device, determining an alternative source of media content from a plurality of alternative sources according to network availability of the alternative source, resolution of the media content, and a subscription status associated with the device;

requesting an increase in an availability of bandwidth for a broadband service connected to the device based on the impairment vector, wherein the increase is based on a reduction of broadband service for a second device having a second subscription status;

requesting an initiation of a streaming of media content via the alternative source; and applying, according to whether a data limit associated with the streaming has been met, a first technique if the data limit has been met or a second technique if the data limit has not been met;

wherein the first technique comprises:
  requesting disabling of the streaming of the media content via the alternative source; and
wherein the second technique comprises:
  determining that the degradation of the satellite signal of the satellite content provider is no longer occurring; and
  requesting disabling of the streaming of the media content via the alternative source responsive to the determining that the degradation of the satellite signal of the satellite content provider is no longer occurring.

10. The device of claim 9, wherein the operations further comprise receiving the media content via a streaming of satellite content from the satellite content provider prior to the degradation of the satellite signal of the satellite content provider occurring in the present geographic area.

11. The device of claim 9, wherein the requesting the initiation of the streaming of the media content further comprises receiving the media content via a broadband connection.

12. The device of claim 9, wherein the determining that the degradation of the satellite signal of the satellite content provider is no longer occurring comprises detecting a restoring of the satellite signal from the satellite content provider.

13. The device of claim 9, wherein the operations further comprise requesting a reduced billing rate for the streaming of the media content while the degradation of the satellite signal of the satellite content provider is occurring.

14. The device of claim 9, wherein the operations further comprise receiving a weather report for the geographic area adjacent to the device to determine if a weather condition is causing the degradation, and wherein the determining of the impairment vector further comprises determining a movement of the weather condition toward the present geographic area from the geographic area adjacent to the device.

15. The device of claim 9, wherein the operations further comprise determining a media content quality for the media content to be received via the streaming.

16. A non-transitory machine-readable storage medium comprising executable instructions that, when executed by a processing system including a processor, facilitate performance of operations, the operations comprising:
- receiving a report from a first geographic area of a satellite content provider that a reception of a satellite signal from the satellite content provider is degraded;
- determining a movement of a condition causing the reception of the satellite signal to be degraded to a second geographic area;
- determining an impairment vector based on the movement to the second geographic area to determine whether customer equipment, in the second geographic area, of the satellite content provider will have a degraded reception of media content from the satellite content provider;
- responsive to a determination, based on the impairment vector, that the customer equipment in the second geographic area will have the degraded reception of the media content, determining an alternative source of the media content from a plurality of alternative sources according to network availability of the alternative source, resolution of the media content, and a subscription state associated with the customer equipment in the second geographic area;
- scheduling an increase in an availability of bandwidth for a broadband service connected to the customer equipment in the second geographic area based on the impairment vector, wherein the increase is based on a reduction of broadband service for second customer equipment;
- initiating a streaming of media content via the alternative source to the customer equipment in the second geographic area according to the impairment vector; and
- applying, according to whether a data limit associated with the streaming has been met, a first technique if the data limit has been met or a second technique if the data limit has not been met;
- wherein the first technique comprises:
  - disabling the streaming of the media content via the alternative source to the customer equipment in the second geographic area; and
- wherein the second technique comprises:
  - disabling the streaming of the media content via the alternative source to the customer equipment in the second geographic area responsive to determining that the second geographic area is no longer impaired by the condition.

17. The non-transitory machine-readable storage medium of claim 16, wherein the determining that the second geographic area is no longer impaired comprises detecting a restoring of a streaming of satellite content from the satellite content provider to the customer equipment in the second geographic area after detecting a predicted degradation of the satellite signal based on the impairment vector.

18. The non-transitory machine-readable storage medium of claim 16, wherein the initiating of the streaming of the media content comprises streaming the media content from a broadband system.

19. The non-transitory machine-readable storage medium of claim 18, wherein the operations further comprise modifying a billing rate for the broadband system while the second geographic area is impaired by the condition.

20. The non-transitory machine-readable storage medium of claim 16, wherein the operations further comprise determining a media content quality for the media content to be received via the streaming.

* * * * *